March 22, 1949.  K. BRENKERT, JR  2,464,792
GENEVA TYPE INTERMITTENT MOVEMENT
Filed May 20, 1947
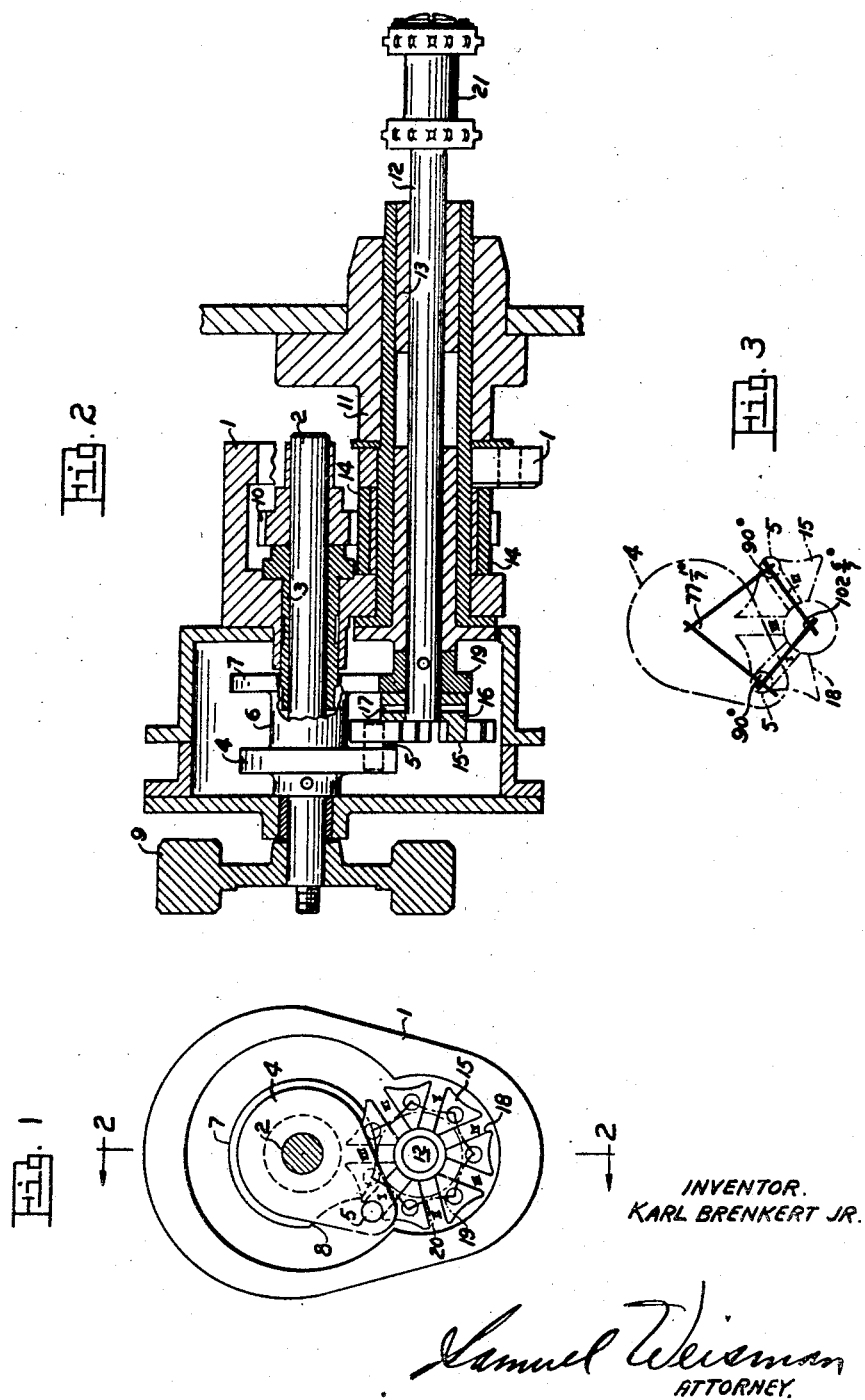
INVENTOR.
KARL BRENKERT JR.
*Samuel Weisman*
ATTORNEY.

Patented Mar. 22, 1949

2,464,792

UNITED STATES PATENT OFFICE 2,464,792

GENEVA TYPE INTERMITTENT MOVEMENT

Karl Brenkert, Jr., Detroit, Mich., assignor to Radio Corporation of America, a corporation of Delaware Application May 20, 1947, Serial No. 749,399

8 Claims. (Cl. 74—436)

The present invention pertains to a novel intermittent movement of the Geneva type designed particularly for motion picture projectors, but also useful in other apparatus.

The conventional Geneva movement consists of a rotatably mounted star wheel having radial slots and an adjacent rotatably mounted cam having a pin or finger adapted to engage with the slots successively and thereby turn the star wheel intermittently. In motion picture apparatus the star wheel is mounted on a shaft that also carries a film feeding sprocket, and it is apparent that the sprocket is also intermittently driven.

The conventional geometry of the star wheel and cam is such that each revolution of the cam turns the star wheel through an angle equal to the angle between two adjacent or successive slots. For convenience of expression in the description and claims, the latter angle will be termed the inter-slot angle. In the described conventional arrangement, a star wheel having four equidistant slots will be turned 90° on each revolution of the cam or will be given a complete turn by four revolutions of the cam. The cam pin enters each slot and departs therefrom when a cam radius through the pin is at a right angle to the axis of the engaged slot. This is known in the art as a tangential relation, and the desirability thereof is also well known in the art.

The conventional motion picture projector employs a four-slot star wheel. The movement of the connected sprocket wheel for advancing the film one frame is a 90° turn of the wheel engaged by the cam during a 90° turn of the latter. The angular displacement of the cam is a function of time since the angular velocity of the cam has been standardized in the industry. Illumination of the screen is obstructed during the shifting of the film for a time proportional to the angular displacement of the cam while in engagement with the star wheel.

It has been desired in the art to reduce the shift-time of the film in order to require shorter intervals of light interruption and hence provide a longer interval of screen illumination in each cycle. This can be done, theoretically, by reducing the angle through which the cam travels in engagement with the star wheel, and this in turn means a larger inter-slot angle in the wheel. The next reduction below four slots is three slots spaced 120° apart, and the cam travels 60° in engagement with the wheel.

The interval of obturation is reduced, in terms of cam displacement (which is a function of time), from 90° to 60°, and the time of film transfer is increased accordingly. Such a high increase in the film transfer speed has been found to be detrimental in several respects, and attempts have been made with complicated mechanisms to effect a transfer speed somewhere between those corresponding to 90° and 60° of cam rotation.

The principal object of this invention is to provide a relatively simple modified Geneva movement capable of producing a film transfer speed between the two speeds mentioned above. This object is accomplished generally by a construction in which the cam pin successively engages, not consecutive slots of the wheel, but slots spaced apart more than one inter-slot angle, so that the displacement of the star wheel on each movement is more than one inter-slot angle. The sum of the inter-slot angles in each displacement is indivisible into 360°, with the result that the same slots are not engaged by the cam pin on each revolution of the star wheel.

An example of such a construction is a star wheel having seven slots and driven by a cam that displaces the wheel through two inter-slot angles on each revolution. If the odd numbered slots are engaged during the first revolution of the wheel, the even numbered slots will be engaged on the next revolution. The angular displacement of the wheel on each revolution of the cam is $2/7$ of 360° or $102^6/7°$. The angular displacement of the cam while in engagement with the star wheel is $77^1/7°$ (the approach and departure of the cam pin being tangential). Since the latter angle of cam displacement is a function of time, the film speed is approximately midway between the speeds produced by 90° and 120° star wheels. Other star wheel speeds may be selected by varying the number of slots therein and the number of inter-slot displacements on each movement.

The invention is fully disclosed by way of example in the following description and in the accompanying drawings in which:

Figure 1 is an elevation of an intermittent movement constructed according to the invention;

Figure 2 is a longitudinal section thereof on the line 2—2 of Figure 1; and

Figure 3 is a diagram.

Reference to these views will now be made by use of like characters which are employed to designate corresponding parts throughout.

In Figure 1 is illustrated a main frame structure 1 in which the various parts are supported.

One of these parts is a cam shaft 2 mounted in a suitable bearing 3 and carrying a cam plate 4. The operating part of the cam is a laterally extending pin 5, and the distance from the axis of the shaft 2 to the center of the pin will hereinafter be termed the cam radius. The plate 4 is preferably formed integral with a sleeve 6 that carries a circular locking plate 7 having a peripheral recess 8 for a purpose that will presently be described. The shaft 2 also carries a flywheel 9 and a driven pinion 10.

Also fitted in the frame 1 is a fixed sleeve 11 in which is journalled a star wheel shaft 12 in suitable bearings 13. On the sleeve 11 is mounted a drive gear 14 meshing with the driven pinion 10 and in turn suitably geared to the power source. The shaft 12 carries a star wheel 15 secured at its hub 16 by a pin 17 passed therethrough. The wheel 15 is disposed adjacent to the cam disk 4 in such manner that the pin 5 may enter the radial slots 18 formed in the wheel, in a manner that will presently be described in detail.

In the plane of the locking plate 7, the shaft 12 carries a locking star 19 having its periphery formed with recesses or scallops 20 having the radius of the plate 7 and adapted to be brought intermittently into concentric relation to the plate 7 in order to be engaged thereby. In this manner the star wheel shaft 12 is locked while the cam pin 5 is out of mesh with the star wheel, as well known in the art. The shaft 12 carries a sprocket 21 having fourteen teeth in each series if the star wheel has seven slots as in the example herein disclosed.

The seven equally spaced radial slots shown in Figure 1 are numbered I, II, III, IV, V, VI, VII. The geometry of the system is such that the cam pin 5, rather than engaging the slots in consecutive sequence or numerical order in the usual manner, engages the slots in a non-consecutive manner, thereby turning the star wheel through more than one inter-slot angle on each movement. In the example shown the order of engagement is I, III, V, VII, II, IV, VI, I, thus turning the star wheel on each movement through an angle of 2/7 of 360° or 102 6/7°. If the approach and departure of the cam pin 5 is tangential, as shown in Figure 3, the angular displacement of the cam, while in mesh with and driving the star wheel, is 77 1/7°.

The light source must be obstructed while the star wheel is in motion or while the film is being shifted. The duration of the star wheel movement is coincident with the cam displacement while the pin 5 is in mesh with the star wheel, or in this case during the displacement of 77 1/7°. The latter angle, as already shown, is directly proportional to the timing of the machine, and in this case lies between the conventional angle of 90°, which it is desired to reduce, and the next ordinarily available angle of 60°, which is too fast. In keeping with the stated object of the invention, a reduced interval of light interruption consistent with mechanical limitations increases the intervals of screen illumination and hence the average or over-all illumination.

The invention in its broader aspect permits variation of the star wheel displacement interval, in proportion to the cam shaft timing, by varying the number of slots in the star wheel and the number of inter-slot angles displaced on each movement. Such regulation may be found desirable in accordance with the specific requirements of intermittently actuated machines other than motion picture apparatus. For example, a star wheel having thirteen slots and displaced through four inter-slot angles on each movement, has a displacement time proportional to 69 3/13° of cam displacement. With fifteen slots and displacement of four inter-slot angles, the star wheel displacement time is proportional to 84° of cam rotation. In the other direction, a star wheel with fifteen slots and a displacement of two inter-slot angles has a displacement time proportional to 132° of cam rotation.

The embodiment of the invention requires no complicated structures or machining operations that depart materially from those associated with the conventional four-slot star wheel. In other words, regardless of the number of slots in the star wheel, the general manufacturing procedure is the same except that more or less of the same kind of operations are performed.

A mathematical characteristic of the invention is that the number of inter-slot angles displaced on each movement of the star wheel is not divisible exactly into the total number of inter-slot angles.

Although a specific embodiment of the invention has been illustrated and described, it will be understood that various alterations in the details of construction may be made without departing from the scope of the invention as indicated by the appended claims.

What I claim is:

1. In a Geneva type intermittent movement, a rotatable wheel having a plurality of slots extending through the periphery, a rotatable cam adapted to engage in said slots separately to displace said wheel angularly, the radius of the cam being such that two radial lines of the cam to the points of engagement and disengagement with the wheel intercept an angle of said wheel consisting of a plurality of inter-slot angles not exactly divisible into the total number of inter-slot angles.

2. In a Geneva type intermittent movement, a rotatable wheel having a plurality of radial slots, a rotatable cam adapted to engage in said slots separately to displace said wheel angularly, the radius of the cam being such that two radial lines of the cam to the points of engagement and disengagement with the wheel intercept an angle of said wheel consisting of a plurality of inter-slot angles not exactly divisible into the total number of inter-slot angles.

3. In a Geneva type intermittent movement, a rotatable wheel having a plurality of radial slots, a rotatable cam adapted to engage in said slots separately to displace said wheel angularly, the radius of the cam being such that a radius to the point of engagement with the wheel forms with the line of centers of said wheel and cam, an angle which is the complement of half of a plurality of inter-slots not exactly divisible into the total number of inter-slot angles.

4. In a Geneva type intermittent movement, a rotatable wheel having a plurality of radial slots, a rotary cam having a pin adapted to approach and depart from said slots separately and tangentially, the radius of said cam from its center to said pin being such that two radial lines of the cam to the points of engagement and disengagement with the wheel intercept an angle of said wheel consisting of a plurality of inter-slot angles not exactly divisible into the total number of inter-slot angles.

5. In a Geneva type intermittent movement, a rotatable wheel having a plurality of equally spaced slots extending through the periphery, a rotatable cam adapted to engage in said slots separately to displace said wheel angularly, the radius of the cam being such that two radial lines of the cam to the points of engagement and disengagement with the wheel intercept an angle of said wheel consisting of a plurality of inter-slot angles not exactly divisible into the total number of inter-slot angles.

6. In a Geneva type intermittent movement, a rotatable wheel having a plurality of equally spaced radial slots, a rotatable cam adapted to engage in said slots separately to displace said wheel angularly, the radius of the cam being such that two radial lines of the cam to the points of engagement and disengagement with the wheel intercept an angle of said wheel consisting of a plurality of inter-slot angles not exactly divisible into the total number of inter-slot angles.

7. In a Geneva type intermittent movement, a rotatable wheel having seven equally spaced slots extending through the periphery, a rotatable cam adapted to engage in said slots separately to displace said wheel angularly, the radius of the cam being such that two radial lines of the cam to the points of engagement and disengagement with the wheel intercept an angle of said wheel consisting of two inter-slot angles.

8. In a Geneva type intermittent movement, a rotatable wheel having seven equally spaced radial slots extending through the periphery, a rotatable cam adapted to engage in said slots separately to displace said wheel angularly, the radius of the cam being such tht two radial lines of the cam to the points of engagement and disengagement with the wheel intercept an angle of said wheel consisting of two inter-slot angles.

KARL BRENKERT, Jr.

REFERENCES CITED

The following references are of record in the file of this patent:

UNITED STATES PATENTS

| Number | Name | Date |
|---|---|---|
| 1,221,097 | Schweitzer | Apr. 3, 1917 |